US008112778B2

(12) United States Patent
Bettis et al.

(10) Patent No.: US 8,112,778 B2
(45) Date of Patent: *Feb. 7, 2012

(54) VIDEO MAIL AND CONTENT PLAYBACK CONTROL WITH CELLULAR HANDSET

(75) Inventors: Sonny R. Bettis, Lawrenceville, GA (US); Ian M. Moraes, Suwanee, GA (US); Jon S. Plotky, Lawrenceville, GA (US); Philip L. Lowman, Ellijay, GA (US); James H. Spencer, Tucker, GA (US)

(73) Assignee: Movius Interactive Corporation, Duluth, GA (US)

( * ) Notice: Subject to any disclaimer, the term of this patent is extended or adjusted under 35 U.S.C. 154(b) by 1174 days.

This patent is subject to a terminal disclaimer.

(21) Appl. No.: 11/307,575

(22) Filed: Feb. 13, 2006

(65) Prior Publication Data

US 2007/0064619 A1 Mar. 22, 2007

Related U.S. Application Data

(63) Continuation-in-part of application No. 11/170,530, filed on Jun. 29, 2005, which is a continuation-in-part of application No. 11/170,459, filed on Jun. 29, 2005, now Pat. No. 7,308,083, and a continuation-in-part of application No. 11/080,744, filed on Mar. 15, 2005.

(60) Provisional application No. 60/584,117, filed on Jun. 30, 2004.

(51) Int. Cl.
*H04N 7/16* (2006.01)

(52) U.S. Cl. ............................... 725/62; 725/88; 725/99

(58) Field of Classification Search ...................... 725/99
See application file for complete search history.

(56) References Cited

U.S. PATENT DOCUMENTS

| 5,629,978 | A | * | 5/1997 | Blumhardt et al. | 370/271 |
|---|---|---|---|---|---|
| 5,682,325 | A | * | 10/1997 | Lightfoot et al. | 709/229 |
| 5,790,174 | A | * | 8/1998 | Richard et al. | 725/99 |
| 5,812,778 | A | * | 9/1998 | Peters et al. | 725/86 |
| 6,981,274 | B2 | * | 12/2005 | Tripathy | 725/93 |
| 2001/0056578 | A1 | * | 12/2001 | Hwang et al. | 725/98 |
| 2004/0040041 | A1 | | 2/2004 | Crawford | |
| 2004/0148638 | A1 | * | 7/2004 | Weisman et al. | 725/115 |
| 2004/0255336 | A1 | * | 12/2004 | Logan et al. | 725/135 |
| 2005/0129385 | A1 | | 6/2005 | Speasl et al. | |
| 2005/0144284 | A1 | | 6/2005 | Ludwig et al. | |
| 2005/0216941 | A1 | * | 9/2005 | Flanagan et al. | 725/88 |
| 2006/0150224 | A1 | * | 7/2006 | Kamariotis | 725/89 |

* cited by examiner

*Primary Examiner* — Pankaj Kumar
*Assistant Examiner* — Timothy Newlin
(74) *Attorney, Agent, or Firm* — Smith Risley Tempel Santos LLC; Gregory Scott Smith (57) ABSTRACT

The playback of video content delivered over a wireless network can be controlled by the provision of various control functions that can be actuated by the user. The controlled playback can be implemented on a system level, in which the delivery of the video content is controlled in response to receiving control actuation signals from a receiver device or can be implemented at the receiver device level by storing the video content and controlling the rendering of the content based on user actuations. In either implementation, the playback control can include pausing, stopping, fast-forwarding, rewinding, reversing, fast-reversing and skipping of the video content.

16 Claims, 5 Drawing Sheets

VIDEO MAIL AND CONTENT PLAYBACK CONTROL WITH CELLULAR HANDSET

CROSS-REFERENCE TO RELATED APPLICATIONS

This application is a continuation-in-part of United States Patent Application filed on Mar. 15, 2005 and assigned Ser. No. 11/080,744, United States Patent Application filed on Jun. 29, 2005 and assigned Ser. No. 11/170,459 now U.S. Pat. No. 7,308,083, and United States Patent Application filed on Jun. 29, 2005 and assigned Ser. No. 11/170,530, each of which claim the benefit of the filing date of United States Provisional Application for Patent entitled DISTRIBUTED IP ARCHITECTURE FOR TELECOMMUNICATIONS SYSTEM, filed on Jun. 30, 2004 and assigned Ser. No. 60/584,117.

This application is related to a United States Patent Application that has a title of DISTRIBUTED IP ARCHITECTURE FOR TELECOMMUNICATIONS SYSTEM WITH VIDEO MAIL, was filed concurrently with this application and is hereby incorporated by reference in its entirety.

BACKGROUND OF THE INVENTION

The present invention relates to the provision of video mail and/or messages in a telecommunications system and, more particular to the playback and the playback-control of the video mail and/or messages from a cellular handset receiver.

Receiving and reviewing voicemail can be a cumbersome process, especially in a business setting or other situation where a substantial amount of voice mail is received. One of the complications arises in that the voicemail messages are serially recorded and during the playback, if a portion of the message is missed, the user needs to back-up to re-listen to the message. Portions of a voicemail message may require repeated review to capture the actual message. This can be due to a variety of reasons including, but not limited to, background noises, poor pronunciation, rapid talking, and garbled audio due to interference in the transmitting, receiving or playback technologies. Using older technology, a user's only option was to restart the playback of the voicemail message. This technique is inadequate in that the user is required to replay the entire message even though only a small portion of the voicemail message may need to be repeated A technique that has been introduced to the market for voicemail messages is a rewind-like capability. This technique allows the user to press a button, such as a key on a telephone keypad, to rewind the message for a duration the of playback time. For instance, pressing the [3] key will rewind a message 6 seconds and then resume playback from that point. Additional rewinding can be obtained by pressing the key repeatedly. This technique provides some improvement in the art by allowing a user to "go back" in the playback of a message to re-listen to a missed portion of the message. However, this technique still lacks much needed capabilities in the ability to review and playback voicemail messages as will be further described.

With the introduction of video messaging and video mail into telecommunications systems, the complexities associated with the playback of messages are even more so exaggerated. One of the reasons that the complexities are exaggerated is that the volume of data included in a video message is substantially greater than a voicemail message. Thus, to rewind the playback of a video message, a significant amount of data must either be buffered at the playback end or retransmitted by the source end. Thus, there is a need in the art for a solution that enables flexibility in the playback of video messages but that is not over burdensome on bandwidth or memory storage requirements.

Another complexity with providing flexibility in the playback of video messages is maintaining synchronization of the video and the audio content. If this content is stored separately, the complexities associated with flexible playback can be significant.

Another complexity with providing flexibility in the playback of video messages is that not only may a user need to re-listen to audio content that may have been missed, but the user may actually need to review the video content, pause the video content to take notes, or search the video message for a particular portion of the video and/or audio content. Current techniques available in the market do not provide the flexibility needed to meet these needs.

Thus, there is a need in the art for a solution that allows a user a wide range of flexibility in the playback and review of video messages. Within the cellular telecommunications environment where bandwidth is a premium, such a solution needs to provide this flexibility in a bandwidth efficient manner. These and other needs in the art are addressed by the present invention described herein.

BRIEF SUMMARY OF THE INVENTION

The present invention provides a solution to the aforementioned needs in the art by providing a technique for controlling the playback of video content in a diversified manner. In one embodiment of the invention, video content is provided to a receiver device from a telecommunications platform is a streaming or block by block manner. The receiver device receives the video content and renders it to a display and speaker. The receiver device, during the rendering of the video, can receive the actuation of one or more control functions to effect the manner in which the video content is continued to be delivered. The control functions can be dedicated keys on the receiver unit, soft keys displayed on a display and associated with hard keys, voice commands or touch sensitive screen icons. Actuation of a control function can result in modifying the rendering of the video content in one of a variety of manners, including but not limited to pausing, stopping, resuming, fast-forwarding, reversing, rewinding, skipping forward, fast-reversing and recording. In this embodiment, a signal identifying the control function is provided to the telecommunications device and the further provision of the video content is controlled based on the control function.

In another embodiment, the video content is stored on the receiver unit and played back or rendered from memory within the receiver unit. In this embodiment, signals are not transmitted to the telecommunications platform, but rather are used internally to control the rendering of the video content as described above.

These and other aspects of the present invention will be more appreciated by reading the detailed description and the figures, along with the claims.

BRIEF DESCRIPTION OF THE SEVERAL VIEWS OF THE DRAWING

Various aspects, features and advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The present invention is generally directed towards providing flexibility in the playback of video mail and video messages, especially as pertaining to the delivery of such content over a cellular telecommunications system. More specifically, aspects and features of the present invention enable a user, such as a digital cellular telephone subscriber, to playback received video mail, or other types of video messages (herein after referred to generally as video content), with great flexibility in rewinding, fast-forwarding, replaying, pausing, rewinding the preview, fast-forwarding with preview, or the like. In one embodiment of the present invention, a receiver device is used to control the playback of the video content by actuating certain key presses, touch screen actuations, spoken commands, etc, to perform selected playback options, transmitting signals associated with such playback options to a source that is providing the playback of the video content, and then controlling the playback of the video content in accordance with the playback options. In another embodiment of the present invention, the video content is buffered in the receiver device and the playback of the video content is controlled within the receiver device by receiving such actuations of the device. Advantageously, these and other aspects of the present invention more fully described below provide an improved flexibility in the playback of video content.

Figure 1:
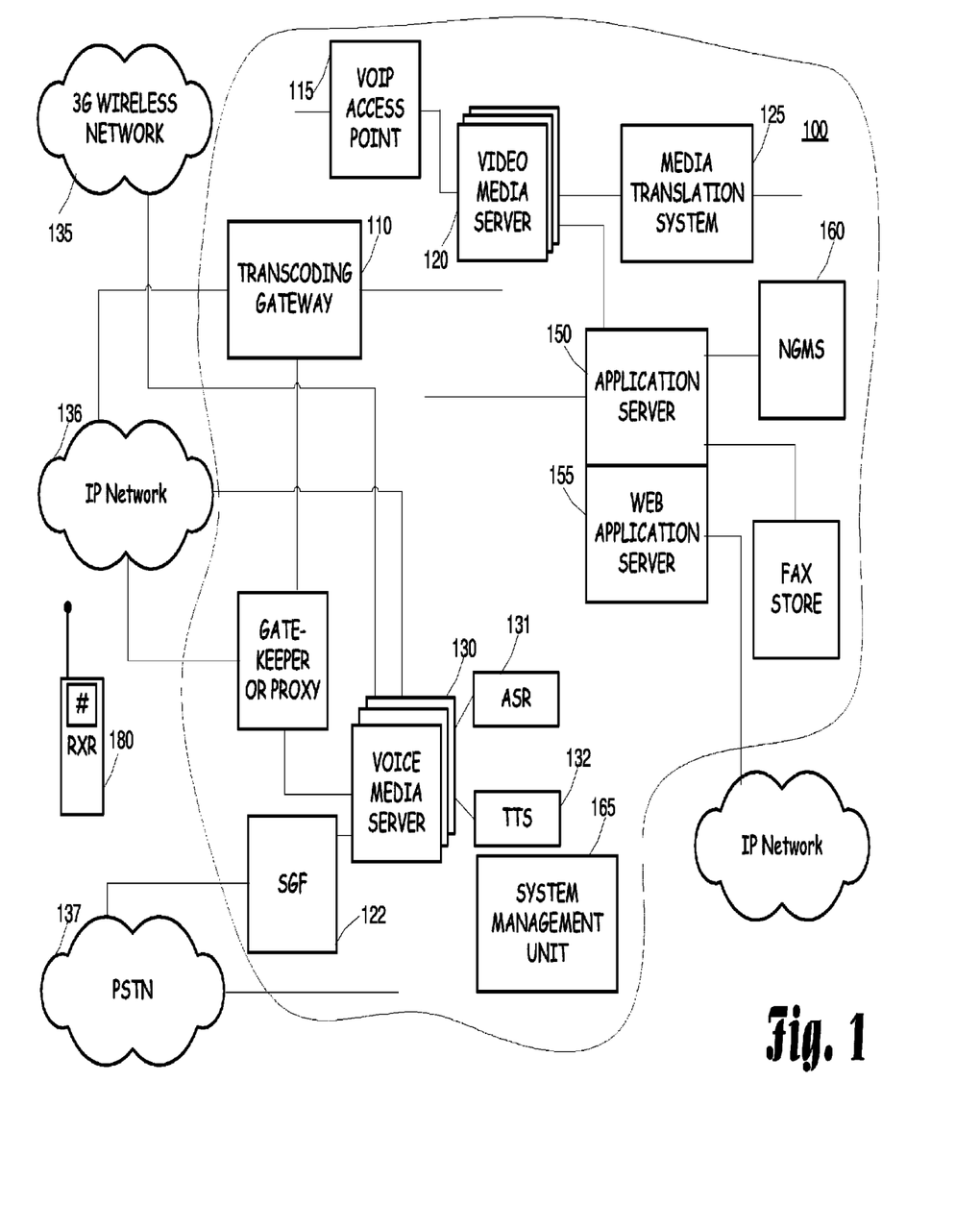
FIG. 1 is a block diagram illustrating a distributed telecommunications platform that provides video mail capabilities over a digital wireless network, as well as other telecommunication capabilities over the wireless and wired telecommunications system.

FIG. 1 is a block diagram illustrating a distributed telecommunications platform that provides video mail capabilities over a digital wireless network, as well as other telecommunication capabilities over the wireless and wired telecommunications system. It should be appreciated the overall architecture of this system is the subject of a separate application for patent and is provided in this description only for illustrative purposes. As such, the illustrated system simply provides one possible platform for implementing various embodiments of the present invention and is not provided as a limiting example.

The illustrated next-generation communications platform 100 employs a distributed IP architecture and is connected to the Public Switched Telephone Network (PSTN) 137 and a third generation or digital wireless network 135 and provides telecommunications support, including video messaging to a digital wireless receiver device 180. The communications platform 100 is illustrated as including a signaling gateway function (SGF) 122, one or more voice media servers 130, one or more system management units (SMU) 165, one or more application servers (AS) 150, one or more next generation message stores (NGMS) 160, a transcoding gateway 110 and one or more video media servers 120.

In general, the SGF 122 serves as the Signaling System 7 (SS7) interface to the PSTN 137 and allows one or more components or sub-systems to share the same point code (thereby reducing the need for destination point codes (DPC) and signaling links for call-control. This makes the telephonic system appear as single trunk group in the network, although sharing the same point code does not necessarily mean all the trunks are in a single trunk group. The voice media server 130 terminates IP and/or circuit switched traffic from the PSTN via a multi-interface design and is responsible for trunking and call control. The application server module 150 generates dynamic VoiceXML pages for various applications and renders the pages through the voice media server 130 and provides an external interface via a web application server configuration. The SMU 165 is a management portal that enables service providers to provision and maintain subscriber accounts and manage network elements from a centralized web interface. The NGMS 160 stores voice messages, subscriber records, and manages specific application functions including notification.

In general, video mail is implemented in the telecommunications platform 100 by including a transcoding gateway 110, a voice over IP access point (VoIP access point or VAP) 115, one or more video mail servers 120, and a media translation engine 125. The transcoding gateway 110 interfaces to a third generation wireless network (3G wireless network or other digital wireless network) 135 over an E1 interfaces that supports the H.324M and 3G-324M protocols or other similarly capable protocols that are in existence or are developed in the future. In addition, the transcoding gateway 110 interfaces to an IP network 136 over an H.323 interface and to the video media server 120 over another H.323 interface.

The transcoding gateway 110 is used to process incoming video messaging traffic and it physically resides between the networks (3G, IP, PSTN) and the video media server 120. The transcoding gateway 110 utilizes both E1 and IP interfaces to the networks and in an exemplary embodiment, interfaces to the video server 120 over an IP interface. In an embodiment of the present invention, the transcoding gateway 110, operates to provide transcoding and proxy functions for call signaling, call setup, command, control and indication between various multimedia systems standards including H.324M/3G-324M, H.323 and SIP. The transcoding gateway 110 preferably supports multiple voice and video codecs. The transcoding gateway 110 is operable to automatically handle clients by: detecting capabilities of client and matching and converting command and control media session announcements. In addition, the transcoding gateway 110 enables universal media experience by including capabilities exchange and mode selection to support a wide variety of devices, handsets and suppliers without the need for customization of the network.

One advantage of using a transcoding gateway 110 is that the video telephony calls can be presented to the video media server 120 in a single audio/video format. Thus, the video media server 120 may not need to provide any transcoding capabilities. Another advantage is that the transcoding gateway 110 can perform all the error handling on the interfaces to the network. Thus, the video media server 120 is not necessarily required to recreate full video frames from the video data stream. These two advantages allow the interface of video media server 120 to be simpler and thus, the video media server 120 will be less expensive yet able to handle more simultaneous calls. The transcoding gateway 110 can be proprietary or one of the commercially available products, such as the one available from Dilithium Networks (the DTG 2000), which provides up to eight E1 interfaces, as well as IP network interfaces.

Another potential advantage to using a transcoding gateway 110 is that some network operators already have them deployed in their networks to provide calling capabilities between the 3G and IP networks. Thus, in deploying embodiments of the present invention, the systems could exploit the existing transcoding gateways.

The VoIP access point 115 operates to balance traffic across the video mail servers 120. More specifically, the VoIP access point 115 distributes calls received at the transcoding gateway 110 to one of the video media servers 120 in such a manner to balance the load between the available video media servers 120.

The video media server 120 operates to terminate IP video traffic and is responsible for call set up and control of video telephony or otherwise provide the management of any video messages within the system. The voice media server 120 can process input from a user in DTMF format (much like a web client gathers keyboard and mouse click input from a user) but can also employ other techniques for information input, such as voice recognition. It then presents content to the user in video and voice form (similar in principle to graphic and text display back to the user on a PC client). This client server methodology enables rapid creation of new applications and quick utilization of content available on the World Wide Web. In an exemplary embodiment, each voice media server 120 includes a client interface for callers and supports voiceXML and Java Script. The application environment for the video mail servers 120 is similar to that as described for the voice media servers 130 below. Each video media server 120 can support approximately between 30-60 simultaneous video calls. Further features of an exemplary video media server 120 include providing call data records, logging and alarm management, telephony management functions, and host media processing.

When a video call is received from a communication device 180 by the system, the video media server 120 answers the call just as if it were a video-capable terminal. No special client is required on the caller's videophone 180. The video media server 120 prompts the caller with both voice prompts and video displays. When recording a message, the video media server 120 captures both the video and audio data, keeping the data synchronized for playback.

The video media server 120 processes incoming calls via requests to the applications server 150 using HTTP. A load balancer directs traffic arriving at the video media server 120 to one of a plurality of applications servers 150. This functionality ensures that traffic is allocated evenly between servers and to active servers only. The video media server 120 works as the VoiceXML client on behalf of the end user in much the same manner as a client like Netscape works on behalf of an HTML user on a PC. A VoiceXML browser residing on a video media server 120 interprets the VoiceXML documents for presentation to users.

The video media server 120 interfaces with transcoding gateway 110 using H.323. The transcoding gateway 110 translates the various audio and video codecs used in 3G-324M and H.323 to G.711 audio and H.263 video for the video media server 120. The VoIP Access Point (VAP) acts as a load balancer to direct incoming calls among the available voice media servers 120. Each video media server 120 constantly communicates its status to the VAP. The VAP routes calls only to video media servers 120 that are running and ready for traffic. Call Detail Records (CDRs) are provided, as well as SNMP alarming, logging, and transaction detail records.

The application server 150 operates to generate dynamic voice XML (VXML) pages or information, manages application processing of any video content and includes an external interface through the web application server 155. The application server 150 interfaces to both the video media servers 120 and the voice media servers 130 and, in response to various requests received from the video media servers 120 and the voice media servers 130, generates appropriate VXML pages or data. Utilizing a web application infrastructure, the application server 150 interfaces with backend data stores (such as the NGMS 160 or user profile databases, content servers or the like). The utilization of the web application infrastructure allows for separation of the core service logic (i.e., providing the business logic) from the presentation details (VXML, CCXML, SALT, XHTML, WML) to provide a more extensible application architecture.

In an exemplary embodiment, the applications server 150 utilizes Java 2 Enterprise Edition (J2EE) environment and Java Server Pages (JSP) to create the dynamic VoiceXML pages for the media servers. To create an environment for easy application development, the applications server 150 supports Template+JSPs. Applications are implemented in JSPs using a proprietary API. These JSPs are readily modifiable making changes in application behavior and creation of new applications very easy.

The voice media server 130 terminates IP and circuit-switched voice traffic and is responsible for call set up and control within the system. The voice media server 130 processes input from the user in either voice or DTMF format (much like a web client gathers keyboard and mouse click input from a user). It then presents the content back to the user in voice form (similar in principle to graphic and text display back to the user on a PC client). This client server methodology enables rapid creation of new applications and quick utilization of content available on the World Wide Web.

The voice media server 130 processes incoming calls via requests to the application server 150 using HTTP. A load balancer directs traffic arriving at the voice media server 130 to one of a plurality of applications servers 150. This functionality ensures that traffic is allocated evenly between servers, and to active servers only. The voice media server 130 works as the VoiceXML client on behalf of the end user in much the same manner as a client like Netscape works on behalf of an HTML user on a PC. A VoiceXML browser residing on the voice media server 130 interprets the VoiceXML documents for presentation to users.

The voice media server 130 interfaces with the PSTN, automatic speech recognition server (ASR) 131 and text-to-speech server 132 (TTS) and provides VoIP (SIP, H.323) support. Incoming circuit switched voice data in 64-kilobit micro-law or A-law pulse code modulation (PCM) format is compressed using G.726 for voice storage in the NGMS 160. VoIP is supported through G.711 and G.723 voice encoding. The voice media server 130 contains a built-in abstraction layer for interface with multiple speech vendors—eliminating dependency on a single ASR 131 or TTS 132 vendor.

The voice media server 130 can include built in codecs and echo cancellation. Call detail records (CDRs), used by service providers for billing purposes, are provided as well as SNMP alarming, logging, and transaction detail records.

Each of these sub-systems are described in more detail in the U.S. patent application Ser. No. 11/080,744 which was filed on Mar. 15, 2005 and to which this present application is a continuation-in-part and thus, is incorporated herein by reference.

The NGMS 160 is utilized to store voice and video messages, subscriber records, and to manage certain application functions such as notification schedules. The NGMS 160 is preferably designed with fully redundant components and utilizes reflective memory and Redundant Array of Independent Disks (RAID) technology for fault tolerance, immediate fail over and recovery.

The NGMS 160 has notification interfaces to SMPP for SMS, SMTP for email, and SMS Alert enabling SMS direct to the handset over SS7.

The media translation engine 125 operates to translate message data between different types of encoding. For instance, the media translation engine 125 can operate to convert message data between voice and data formats and encodings. One aspect of the media translation engine 125 is that it enables the playback of video messages on a device or telephone that does not support video, as well as the playback of voice only messages on video based calls. The media translation engine 125 also provides conversion for web message access and email message delivery. Preferably, the media translation engine 125 includes a dedicated digital signal process for high throughput.

The system management unit (SMU) 165 communicates with each of the other elements and/or components in the system to provide provisioning services, alarm management and collection of customer data records (CDR). The SMU provides a centralized point for service providers to manage all network elements, providing remote access, maintenance, and backup functionality. As such, the system management unit 165 provides system configuration and setup, network management and system monitoring, statistics and reporting, fault management and alarms, subscriber and mailbox administration, computer interface for centralized provisioning, CDR capture for billing, as well as other services.

The SMU 165 provides a single interface for provisioning, alarming, reports, and subscriber migration. The SMU 165 integrates and customizes systems with new elements and applications, and provides operational support and network management functions for carriers experiencing swiftly growing networks and exploding traffic volumes. Core features of the element management component include:

Element Auto-Discovery—when service providers add new network elements, the SMU 265 automatically recognizes them and includes the new elements in the graphical network map.

Graphical Network Map—a network/cluster map and map editor provides a snapshot of the entire network or cluster and facilitates quick problem identification and resolution.

Time Synchronization—a central time source ensures all network components maintain a uniform time reference across the entire messaging network—important for any distributed architecture.

Centralized network logging—logging for the entire messaging network is centralized on the SMU 165.

For system configuration and setup, the SMU 165 supports the functions of Class of Service (COS), software configuration and setting up and initializing system parameters. The network management and system monitoring aspect of the SMU 165 supports the functions of real-time system monitoring of hardware and software, tracking of resource usage and monitoring traffic statistics and load. The SMU 165 also provides statistics and reporting through supporting standard built-in reports, custom reports and usage and loading reports. The SMU 165 provides fault management and alarms by supporting a centralized logging and reporting of faults, alarms in real time and discovery functions. Subscriber and mailbox administration is provided in the SMU 165 through supporting the ability to add, delete, modify, query and configure subscriber records, defining features on a subscriber basis and maintaining subscriber records and COS creation. The SMU 165 provides a computer interface for centralized provisioning including automated provisioning directly from external billing/provisioning systems via a flexible key-word interface.

The SMU 165 uses a dual processor computer and allows remote dial-in for access to the SMU 165 as well as all other servers in the system via Telnet. Backup of system configurations and other critical data is also accomplished via the SMU 165.

The next generation message store (NGMS) 160 operates to store voice messages, video messages and subscriber records, as well as manages specific functions including notification. Thus, in the illustrated embodiment, the NGMS 160 provides storage for both voice and video messages. The system can employ the use of multiple NGMS components to increase the memory size and the number of subscribers that can be supported.

The SGF 122 offers a consolidated SS7 interface creating a single virtual SS7 signaling point for the system. SS7 provides the extra horsepower networks need, whether large or small. Sigtran interface (IETF SS7 telephony signaling over IP) to the media servers as well as IP Proxy functions are supported via SGF. Consolidating SS7 provides the benefits of reduced point codes and easier maintenance.

The availability of point codes is typically limited. The consolidation of signaling links eases the pressure on these resources or eliminates the need for additional point codes altogether. In this way, the SGF 122 provides immediate network simplification and cost savings. The SGF 122 presents the appearance of a single identity to the SS7 network via the single "virtual" point code of the network and recognizes and processes messages in a transparent manner. The SGF 122 reduces the maximum number of point codes needed in some cases from 50 to only 4.

Various features, advantages and benefits of the SGF 122 include:

allowing multiple multi-function media servers to share signaling links and point codes (PC) providing significant cost savings;

providing concentrated SS7 signaling links;

providing one trunk group across multiple multi-function media servers; and requiring less SS7 links resulting in reduced monthly connection fees Thus, the present invention includes an integrated telecommunications platform that supports video mail, voicemail and optionally fax messages simultaneously with simplified access to each type of message. The NGMS 160 provides message storage and retrieval for video, voice and fax within a subscriber's mailbox. In one embodiment, the subscriber can access video mail, voicemail and fax messages separately, and in another embodiment, the subscriber can access all messages in an integrated manner.

A single user profile can be defined to support all of the available services. The SMU 165 provides the provisioning interface to access the subscriber records and to enable and disable services. Individual services such as video mail, voicemail and fax can be selected and configurable on a class of service and user profile basis.

The video deposit operation stores video message content in a different format from voice messages. Incoming video messages are recorded on the video media server 120. The recorded messages are saved as raw audio and video data—stored separately. The message durability techniques are then used to move these messages to the application server 150. Advantageously, storing the audio and video portions of the message separately decreases the complexity of the system. For instance, the data rates for audio and video are different, and the difference amount varies, making simple interleaving difficult. If the two data types were to be interleaved, an extended file format such as AVI or 3GP would have to be used. This would increase the processing load on the video media server 120. At playback time, the audio and video data must be fed separately to the video media server 120 software stack, at different and varying rates. If the streams are interleaved, additional processing and buffering are required on the video media server 120 to accommodate playback. In addition, there are circumstances when only a portion of a message (i.e., the audio portion or the video portion) needs to be retrieved. If the two data types were combined, the NGMS 160 would have to have knowledge of the internal structure of the data (e.g. AVI) to retrieve just the audio or video part. Storing the audio and video separately avoids this issue.

The NGMS 160 operates to manage both audio messages, as well as video messages with or without audio. An account and message database within the NGMS 160 keeps track of the video messages thereby allowing the current applications to work with video messages. Message waiting notification features available for voice messages are also applied for video messages. Thus, those skilled in the art will appreciated that the video, voice and fax messages are stored in the NGMS 160 and are accessible by the subscriber.

Figure 2:
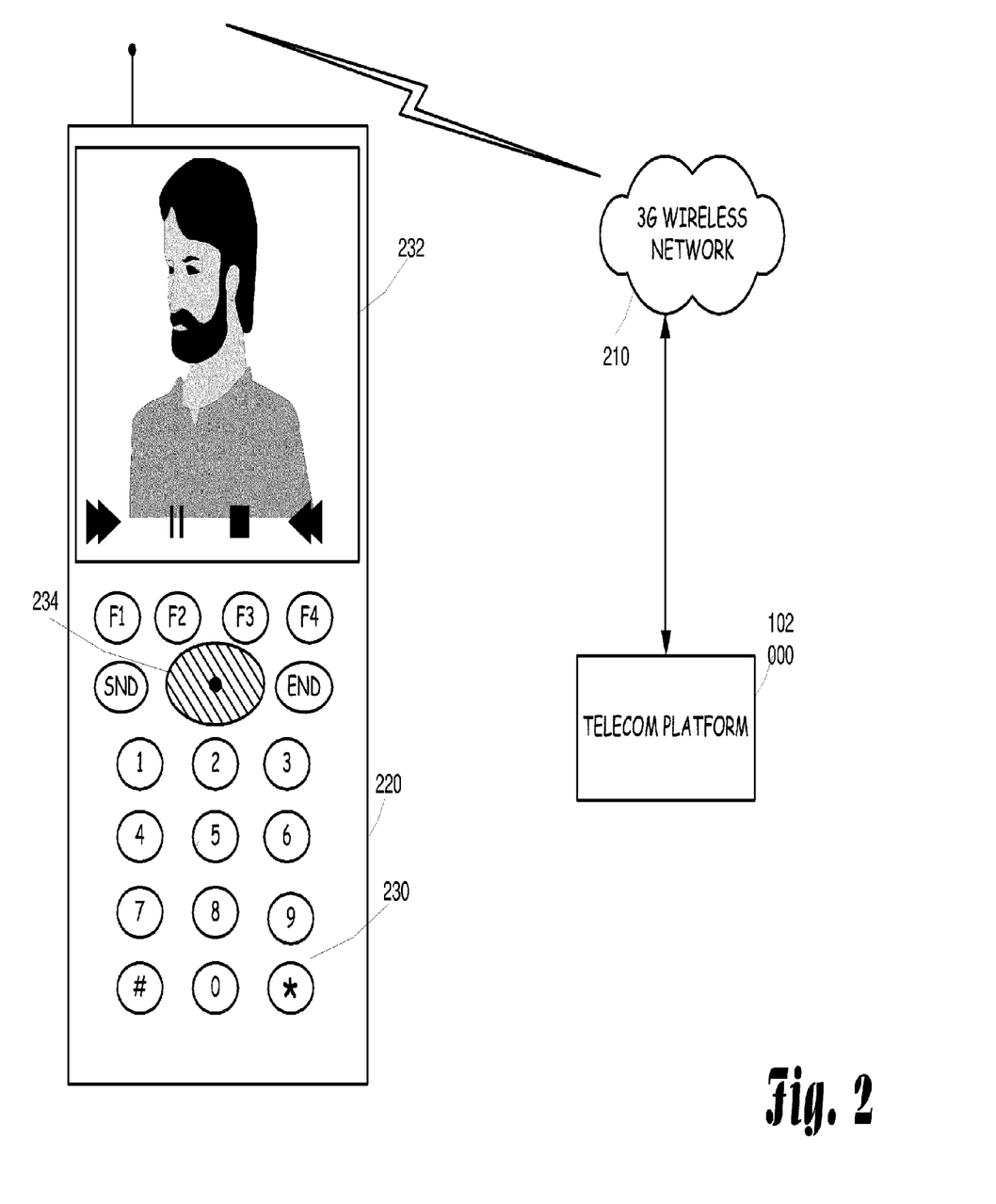
FIG. 2 is a block diagram illustrating a system that includes a digital cellular device and that implements an embodiment of the present invention that provides flexible control of video mail playback.

FIG. 2 is a block diagram illustrating a system that includes a digital cellular device and that implements an embodiment of the present invention that provides flexible control of video mail playback. In the illustrated embodiment, a telecommunications platform 200 provides video based telecommunications services over a digital wireless 210. A receiving device 220 receives video content from the telecommunications platform 200 through the digital wireless network 210. The video content can be streamed from the telecommunications platform 200 to the receiving device 220 or it can be downloaded entirely to the receiving device 220 in various embodiments of the present invention. The receiving device 220 includes a keypad 230, a display 232 and a speaker 234.

The illustrated display 232 includes a main image area 236 and a control-overlay area 238. The main image area 236 is shown as including a single frame of a video feed. In this embodiment, various control function icons are placed onto the control-overlay area 238 to allow a subscriber to perform various control functions over the playback of video content. Each of the control function icons is positioned to be in association with a function key of the keypad 230. Thus, by actuating the function key associated with the illustrated control function icon, the function is invoked. In this example the following function keys and control function icon relationships exist when the receiver device 180 is in the state of playing back a video message:

F1—Fast Forward
F2—Pause Playback
F3—Stop Playback
F4—Rewind

If the pause playback or stop playback functions are selected, the control function icons can be changed to represent a new state. For instance, if the video playback state is paused, the control function icon for the pause can be replaced by a single arrow to indicate the resumption of playback. Similarly, if the video playback is in the stopped state, the control function icon for the stop can be replaced by a single arrow to indicate the resumption or start of playback.

It should be appreciated that various techniques can be used to implement the control function provision aspect of the present invention. And although one or more of the presented techniques may in and of itself be considered novel, the present invention is not limited to any particular embodiment.

One technique for providing the control function aspect of the present invention is illustrated in FIG. 2 and already described. This technique is the overlaid function key association embodiment. Basically, this embodiment includes providing an overlay of icons, words, acronyms, mnemonics or other label or representation (generally described as icons) that appears on an area of the display 232. The various icons may be physically associated with a function key located in proximity to the icon, or the icon may help to identify the associated function key either with a label, color, a directional line, etc. The overlay may appear on the display 232 as a permanent feature during the playback of video content or, it may only be displayed momentarily. For the momentary display, the overlay may appear in response to the user performing an actuation, such as pressing a key, reciting a voice command or the like. In such an embodiment, the overlay may be temporarily displayed for a period of time and then removed from the display. In another embodiment, the overlay may periodically appear on the display 232 for a period of time and then fade or be removed from the display. In one embodiment, the overlay may cover a portion of the video content being displayed. In another embodiment, the overlay may be transparent and only the icons appear on the display 232. In another embodiment, the icons themselves may be transparent and the video content can be seen through the icons. In yet another embodiment, the display 232 aspect ratios may be changed with the image of the video content being resized to make dedicated space on the display 232 for the icons. Another variation of the overlaid function key association embodiment is to use this embodiment in conjunction with a touch sensitive screen. In this embodiment, the user can simply touch the icon on the screen, or an area of the screen associated with the icon to actuate the particular function.

Also, as illustrated in conjunction with the description of FIG. 2, the overlay may change based on the various states of the message playback. If the playback has not yet started, one set of icons may be included in the overlay, if the playback is active, another set of icons may be included in the overlay.

Figure 3A:
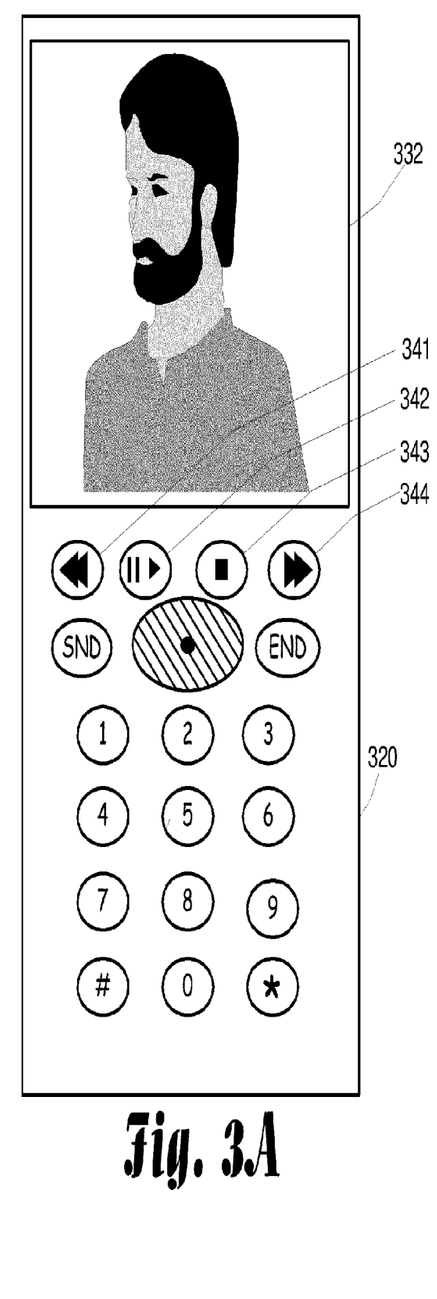
FIG. 3A is a diagram illustrating another technique for providing the control function aspect of the present invention—dedicated keys.

FIG. 3A is a diagram illustrating another technique for providing the control function aspect of the present invention—dedicated keys. In this embodiment, the display 332 is dedicated to the video content, or at a minimum, is not used for displaying control function icons. Rather, various keys are dedicated to the control functions. The receiver device 320 includes a fast-forward key 341, a pause/play key 342, a stop key 343 and a rewind key 344. It should also be appreciated that this embodiment of this aspect of the present invention can also be implemented using the regular number keys or DTMF keys.

Figure 3B:
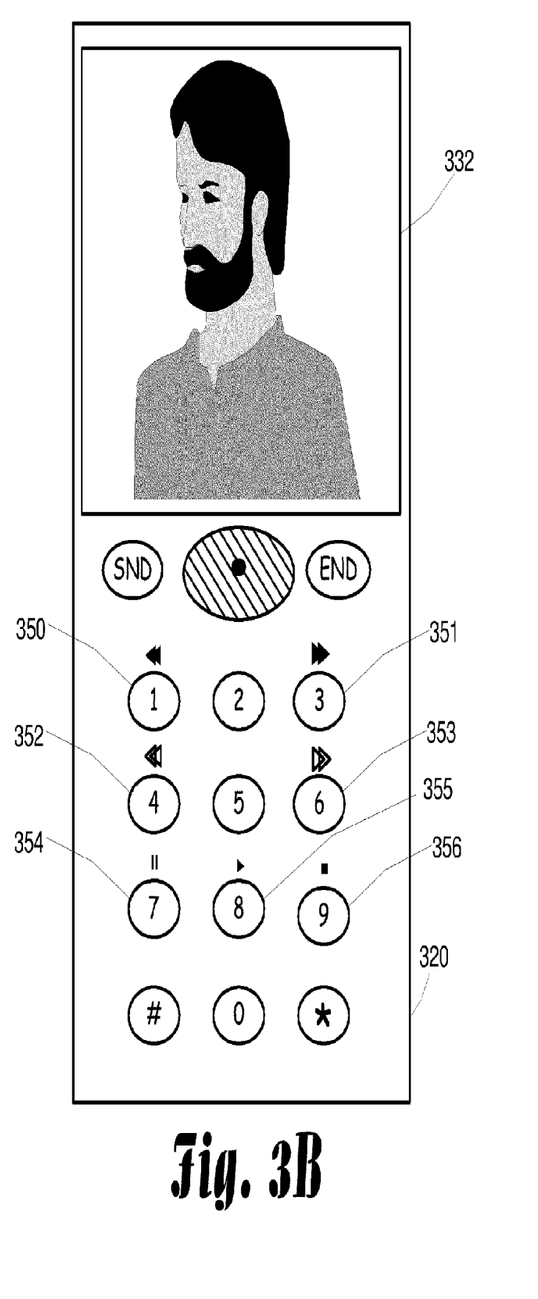
FIG. 3B is a diagram illustrating the dedicated keys embodiment of the control function aspect of the present invention using DTMF or numbered keys.

FIG. 3B is a diagram illustrating the dedicated keys embodiment of the control function aspect of the present invention using DTMF or numbered keys. In this embodiment, the labels are affixed to the keys or are associated with the keys to indicate the various functions associated with the key during video content playback. In this embodiment, no additional function keys are needed on the receiver device 320. Again, the display 332 does not dedicate any space of icons for the control functions but rather, the standard number, # and * keys available on any such receiver device are used for the control functions. The functions can be associated with any of the keys and the illustrated embodiment is a non-limiting example of one key assignment. In the illustrated embodiment, the fast-forward function 350 is shared with the [1] key and the rewind for fast-reverse function 351 is shared with the [3] key. Similarly, an alternative forward function 352 is shared with the [4] key and an alternative rewind function 353 is shared with the [6] key. The alternative forward and rewind function can be used to provide additional playback capabilities. For instance, the alternative forward and reverse functions can be a slower fast-forward or rewind. Alternatively, the alternative forward and reverse functions can be a forward and rewind with active video. This aspect of the present invention allows a user to scan forward or backwards in a video message to find a video frame that identifies the point they wish to resume playback at or where to pause. In another alternative, the alternate forward and reverse functions can be skipping to the next, return to the start or go to the previous video message functions. The pause function 354 is shared with the [7] key, the play function 355 is shared with the [8] key and the stop function 356 is shared with the [9] key.

It will be appreciated that one aspect of the present invention is to provide a variety of playback control functions for the video content. Some of these playback control functions have been presented and are summarized below, along with additional playback control functions. However, although the specific playback control functions and certain combinations of the playback control functions may in and of themselves be considered novel, the present invention is not limited solely to the particularly identified playback control functions or combinations of playback control functions. In fact, broader aspects of the present invention anticipate additional playback control functions that may not be identified in the context of the present description.

Playback functions that can be incorporated into various embodiments of the present invention include, but are not limited to:

a pause function that will suspend, either permanently or temporarily the delivery or rendering of the video content;

a stop function that will suspend the delivery or rendering of the video content;

a skip-forward function that will continue with the delivery or rendering of the video content by skipping a portion of the video content;

a fast-forward function that will continue with the delivery or rendering of the video content by skipping portions of the video content (i.e., displaying only thumbnails or selected frames of the video content);

a rewind function that will continue with the delivery or rendering of the video content by restarting the delivery or rendering of the video content at a point in the video content that had previously been delivered or rendered;

a reverse function that will continue with the delivery or rendering of the video content in reverse order on a frame by frame basis or otherwise;

a fast-reverse function that will continue with the delivery or rendering of the video content in reverse order and skipping portions of the video content (i.e., displaying only thumbnails or selected frames of the video content); and a record function that will begin recording and storing into memory the delivered or rendered video content.

Figure 4:
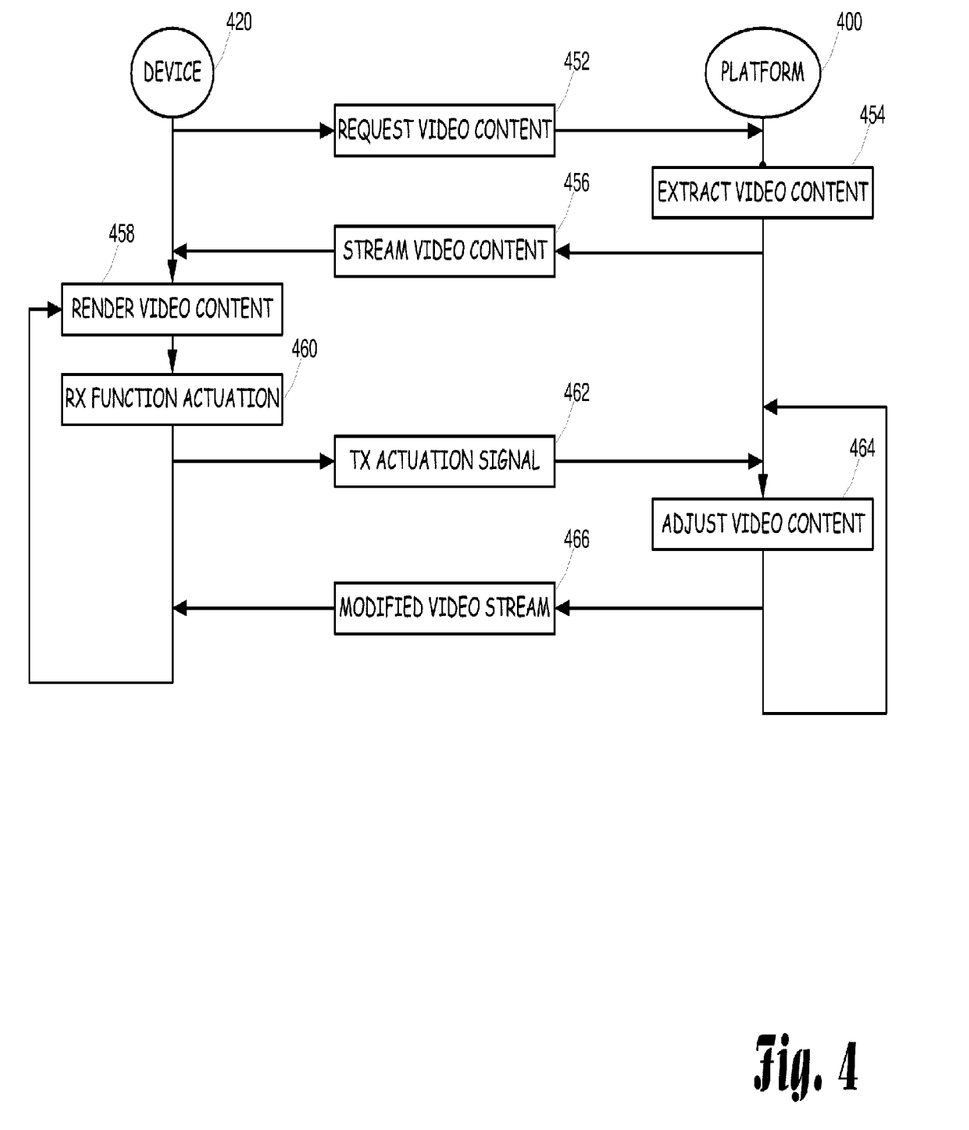
FIG. 4 is a timing diagram illustrating a server or platform based embodiment of the flexible playback control of video content aspect of the present invention.

FIG. 4 is a timing diagram illustrating a server or platform based embodiment of the flexible playback control of video content aspect of the present invention. In general, a playback device or receiver device 420 interfaces with the telecommunications platform 400 over a digital wireless network (not shown) for requesting and receiving the playback or rendering of video content. The receiver device 420 can be presented with a menu of available video content and the user can select one of the items for playback or rendering. During the playback of the video content, the present invention provides the user with the ability to augment or modify the playback of the video content. As described above, the present invention provides various control functions that the user can select from during the playback of the video content. The timing diagram of FIG. 4 illustrates exemplary data flow between a receiver device 420 and the telecommunications platform 400 for the provision of playback control based at the telecommunications platform. As such, during the playback or rendering of the video content, the user can actuate control functions that are sent from the receiver device 420 to the telecommunications platform 400. The telecommunications platform 400, in response to such control functions augments the streaming flow of the video content.

Initially, the receiver device 420 request the provision of video content 452 from the telecommunications platform 400. This request can be comprised of a variety of operations such as requesting the playback of a video mail message or any other variety of video content, such as weather reports, movie clips, news clips, etc. The telecommunications platform 400 processes the requests 452, identifies the requested content and extracts the content, or begins the extraction of the content 454 for delivery to the receiver device 420. The telecommunications platform then begins the delivery of the video content by streaming the video content 456 to the receiver device 420. The receiver device 420 receives the streaming video and begins to render 458 it on a display of the receiver device 420. While the video content is being rendered by the receiver device 420, a user may actuate a control function, such as pause, fast forward, reverse, etc. 460. In response to such actuation, the receiver device 420 transmits an actuation signal 462 to the telecommunications platform 400. In response to the receipt of the actuation signal 462, the telecommunications platform 400 adjusts the video content 464. The adjustment performed is dependent at least in part on the actuation signal but, those skilled in the art will appreciate that the characteristics of the video content, the type of receiver device, the class of service being provided, and other factors may also play a part in determining the adjustments performed. For instance, if the actuation signal is a fast-forward function, the video content may be adjusted by skipping forward a particular number of seconds in the video stream and then resuming at that point. Alternatively, if the actuation signal is a pause function, the video stream may be stopped or a single still thumbnail shot of a pause screen or shadowed picture of a still frame may be sent to the receiver device 420. If the actuation signal is a rewind, the telecommunications platform 400 may resume the stream of the video content at a fixed number of seconds back from the present point. In these as well as other scenarios, the telecommunications platform 400 then provides a modified video stream 466 to the receiver device 420. Processing at the receiver device 420 then resumes waiting for the next actuation from the user and, at the telecommunications platform 400 waiting for the next actuation signal.

Advantageously, this embodiment of the present invention provides enhanced playback control of the video content without creating a huge bandwidth burden. Portions of the video content can be skipped thereby reducing the time for the video playback and the video content can be rewound to a point with minimal overhead. In addition, for embodiments of the invention that are based on DTMF signals to provide the actuation signals, this embodiment of the invention can be implemented without requiring any changes to the receiver device, or at a maximum, only requiring an aesthetic change to the keypad or case.

Figure 5:
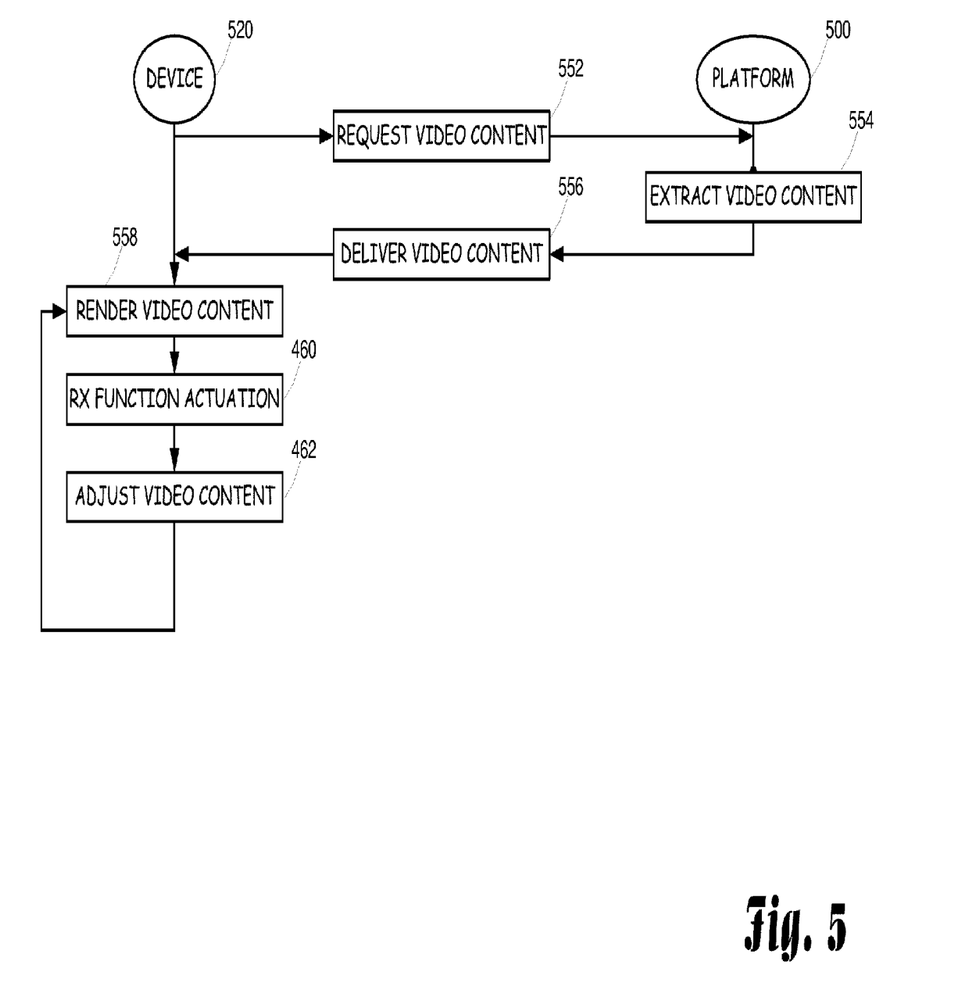
FIG. 5 is a timing diagram illustrating a receiver device based embodiment of the flexible playback control of video content aspect of the present invention.

FIG. 5 is a timing diagram illustrating a receiver device based embodiment of the flexible playback control of video content aspect of the present invention. In general, in this embodiment of the invention a receiver device 520 receives video content from a telecommunications platform and stores the video content, either in its entirety or buffers portions of the video content and then enables the flexible playback of the content. Initially, the receiver device 520 requests video content 552 from the telecommunications platform 500. The telecommunications platform 500 then identifies the video content associated with the request, extracts or begins to extract the video content 454 and then provides the entire content or a portion of the content 556 to the receiver device 520. The receiver device 520 stores the received content and then begins to render the content 558 to a display of the receiver device 520. While the content is being rendered, or played, the user of the receiver device 520 may actuate a control function. In response to receiving such actuation 560, the receiver device adjusts the video content 562 and then continues to render the video content 558 in accordance with the adjustment. For example, if the user actuates a rewind function, the receiver device may jump back in the video a certain amount and then continue rendering the video content at that point. If the user actuates a fast-forward function, the receiver device may skip ahead in the video content a certain amount and then resume rendering the video content at that point. To implement this feature, the receiver device 520 is required to either have previously received the entire video content, or at least a portion of the video content that has not yet been rendered. Alternatively, the receiver device 520 may have to request additional video content from the telecommunications platform 500.

Advantageously, this embodiment of the present invention does not require any additional overhead or bandwidth requirements for the telecommunications network as the video content is already received and the functionality is all provided within the receiver device.

In some embodiments of the present invention, the video content may be stored in a single file that contains both the video and audio in a synchronized manner. However, in other embodiments the video and audio content may be stored separately and some mechanism must be employed to maintain synchronization of the video and audio content during the playback. One method to maintain this synchronization is by using an RTP stamp. In other embodiments, the video and audio content may be segmented and synchronized segment by segment.

Another aspect of the present invention is to allow rewinding and fast-forwarding of the video content by using scan points. The video content can be segmented into multiple portions based on content, time or complexity. For each segment, a thumbnail can be created to represent the segment. The thumbnail will most likely be the first frame of the segment or the most common or significant frame of the segment. Each of the thumbnails are earmarked to coincide with a start point in the video content. If a user actuates a scan forward or scan backward feature, the thumbnails can be serially rendered on the display of a receiver device to facilitate identifying the point at which the user wishes to resume playback. Once the desired thumbnail is displayed, the user can resume playback by either actuating a play function or by removing the actuation of the scan function. The identity of the thumbnail is then determined and the index into the video content associated with that thumbnail is identified. Playback of the video content then resumes at that point by providing the video content to the receiver device or extracting the video content from memory and rendering it on the display of the receiver device.

Another aspect of the present invention is to provide a record function. Using this feature, the user can actuation the record function during the playback of video content and the video content can be stored into memory. By actuating the record function multiple times, the video content can basically be edited to only include highlights or important points. The stored edited or recorded video content can then be forwarded as video mail to another user or simply retained in the user's device for later playback.

Thus, it has been shown that the present invention provides a solution for flexible playback of video content. Although the primary application for the invention has been described as providing video content over a digital cellular wireless network, those skilled in the art will appreciate that the various aspects and features of the present invention can be equally applied in the delivery of video content over any transmission medium. Thus, the present invention has been described using detailed descriptions of embodiments thereof that are provided by way of example and are not intended to limit the scope of the invention. The described embodiments comprise different aspects and features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for providing playback control of video content delivered through a wireless cellular network from a video messaging source, the method comprising the steps of:

establishing a communication link between the video messaging source and a caller device, wherein the video messaging source is configured to terminate circuit-switched traffic over a public switched telephone network ("PSTN") and the communication link is established as a result of the video messaging source terminating a call from the caller device to a destination number associated with the video messaging source;

leveraging the caller device to deposit a video message at the video messaging source, the deposited video message being directed to an account associated with a subscriber of the video messaging source;

establishing a communication link between the video messaging source and a receiver device associated with the subscriber, wherein the communication link is established as a result of the video messaging source terminating a call from the receiver device to a destination number associated with the video messaging source;

continuously delivering video content, in a first manner, from the source, wherein the manner of continuous delivery is a linear progression of video frames at a given rate;

receiving from the source the continuously delivered video content at the receiver device, wherein the delivered video content is received continuously as a linear progression of video frames at a given rate that is equivalent to the first manner of continuous delivery;

commencing the rendering of the continuously received video content on a display of the receiver device starting with the first frame of video content received;

detecting the actuation of a control function at the receiver device during the rendering of the continuously received video content;

transmitting a signal to the source during the rendering of the continuously received video content, the signal identifying the control function actuated; and in response to receiving the signal, the source modifying the manner of the continuous delivery of the video content to a second manner that is associated with the detected actuation, wherein the second manner of continuous delivery comprises a modification of the given rate at which the linear progression of video frames is delivered.

2. The method of claim 1, further comprising the steps of:

receiving the continuously delivered video content in the second manner at the receiver device; and rendering the continuously received video content on the display commensurate with the second manner of continuous delivery.

3. The method of claim 2, wherein the step of modifying the manner of delivery to the second manner further comprises the steps of:

the source identifying a frame in the video content that differs from the last frame delivered per the first manner of continuous delivery; and transmitting the video content by transmitting beginning with the identified frame, wherein the second manner of continuous delivery serves to translate the linear progression of video frames from the last frame delivered per the first manner of delivery to the identified frame.

4. The method of claim 1, wherein the step of modifying the continued delivery of the video content to a second manner comprises the steps of:

suspending the rendering of the video content based on the identified actuated control function;

detecting a subsequent actuated control function;

transmitting a subsequent signal to the source, the subsequent signal identifying the subsequent control function identified; and continuing the rendering of the video content in a manner based on the subsequent actuated control function, wherein the subsequent actuated control function identifies a manner of continuous delivery that is different from the first manner.

5. The method of claim 3, wherein the identified frame is located at a position in the linear progression of video content that is prior to the position of the last frame delivered.

6. The method of claim 3, wherein the identified frame is located at a position in the linear progression of video content that is after the position of the last frame delivered.

7. A telecommunications platform for providing controlled playback of video messaging content, the telecommunications platform being configured to terminate a call on a public switched telephone network ("PSTN") and comprising:

a network interface to a digital wireless network enabling communication with a caller device and a receiver device, wherein the receiver device is associated with a subscriber of the telecommunications platform;

a memory device for containing video content in one or more subscriber accounts; and a processing device operative to:

deposit a video content into a subscriber account, wherein the video content is deposited as a result of the caller device being leveraged to make a call to a destination number accessible via the PSTN and associated with the telecommunications platform;

receive a request for the video content from the receiver device, wherein the request is received as a result of the receiver device being leveraged to make a call to a destination number accessible via the PSTN and associated with the telecommunications platform;

begin a continuous delivery of the video content, in a first manner, in response to the request, wherein a manner of continuous delivery is a linear progression of video frames at a given rate beginning with a certain frame; and modify the continuous delivery of the video content to a second manner in response to receiving an actuation signal from the receiver device, wherein modification to the second manner of continuous delivery comprises modifying the given rate at which the linear progression of video frames is delivered per the first manner.

8. The telecommunications platform of claim 7, wherein the processing device is operative to modify to a second manner the continuous delivery of the video content in response to receiving an actuation signal from the receiver device by suspending the delivery of the video content in response to an actuation signal associated with a pause function.

9. The telecommunications platform of claim 7, wherein the processing device is operative to modify to a second manner the continuous delivery of the video content in response to receiving an actuation signal from the receiver device by continuing with the delivery of the video content by skipping a portion of the linear progression of frames of video content in response to an actuation signal associated with a skip-forward function.

10. The telecommunications platform of claim 7, wherein the processing device is operative to modify to a second manner the continuous delivery of the video content in response to receiving an actuation signal from the receiver device by continuing with the delivery of the video content by skipping portions of the linear progression of frames of video content in response to an actuation signal associated with a fast-forward function.

11. The telecommunications platform of claim 7, wherein the processing device is operative to modify to a second manner the continuous delivery of the video content in response to receiving an actuation signal from the receiver device by continuing with the delivery of the video content by restarting the delivery of the video content at a point in the linear progression of frames of video content that had previously been delivered in response to an actuation signal associated with a rewind function.

12. The telecommunications platform of claim 7, wherein the processing device is operative to modify to a second manner the continuous delivery of the video content in response to receiving an actuation signal from the receiver device by continuing with the delivery of the video content in reverse order on a frame by frame basis in response to an actuation signal associated with a reverse function.

13. The telecommunications platform of claim 7, wherein the processing device is operative to modify to a second manner the continuous delivery of the video content in response to receiving an actuation signal from the receiver device by continuing with the delivery of the linear progression of frames of video content in reverse order and skipping portions of the video content in response to an actuation signal associated with a fast-reverse function.

14. The telecommunications platform of claim 8, wherein the processing device is further operative to modify the continuous delivery of the video content in response to receiving an actuation signal from the receiver device by:

resuming with the continuous delivery of the video content at the last frame delivered in response to an actuation signal associated with a play function.

15. The telecommunications platform of claim 14, wherein the processing device is further operative to modify the delivery of the video content in response to receiving an actuation signal from the receiver device by:

resuming with the delivery of the video content by skipping a portion of the video content in response to an actuation signal associated with a skip-forward function;

resuming with the delivery of the video content by skipping portions of the video content in response to an actuation signal associated with a fast-forward function;

resuming with the delivery of the video content in reverse order on a frame by frame basis in response to an actuation signal associated with a reverse function; and resuming with the delivery of the video content in reverse order and skipping portions of the video content in response to an actuation signal associated with a fast-reverse function.

16. The telecommunications platform of claim 7, wherein the processing device is operative to modify the continuous delivery of the video content in response to receiving an actuation signal from the receiver device by:

suspending the delivery of the video content in response to an actuation signal associated with a pause function;

resuming with the delivery of the video content by skipping a portion of the video content in response to an actuation signal associated with a skip-forward function;

resuming with the delivery of the video content by skipping portions of the video content in response to an actuation signal associated with a fast-forward function;

resuming with the delivery of the video content by restarting the delivery of the video content at a point in the video content that had previously been delivered in response to an actuation signal associated with a rewind function;

resuming with the delivery of the video content in reverse order on a frame by frame basis in response to an actuation signal associated with a reverse function;

resuming with the delivery of the video content in reverse order and skipping portions of the video content in response to an actuation signal associated with a fast-reverse function.

\* \* \* \* \*